United States Patent
Yoon et al.

(10) Patent No.: US 10,666,319 B2
(45) Date of Patent: May 26, 2020

(54) METHOD FOR SYNCHRONIZED COMMUNICATION IN ACCESS NETWORK APPLIED G.HN TECHNOLOGY THERETO, ACCESS NETWORK MULTIPLEXER, ACCESS NETWORK TERMINAL AND ACCESS NETWORK SYSTEM USING THE SAME

(71) Applicant: UBIQUOSS INC., Seongnam-si, Gyeonggi-do (KR)

(72) Inventors: Chang Il Yoon, Seoul (KR); Jae Kug Kim, Seoul (KR)

(73) Assignee: UNIQUOSS INC. (KR)

( * ) Notice: Subject to any disclaimer, the term of this patent is extended or adjusted under 35 U.S.C. 154(b) by 578 days.

(21) Appl. No.: 15/301,384

(22) PCT Filed: Mar. 26, 2015

(86) PCT No.: PCT/KR2015/002972
§ 371 (c)(1),
(2) Date: Oct. 1, 2016

(87) PCT Pub. No.: WO2015/152569
PCT Pub. Date: Oct. 8, 2015

(65) Prior Publication Data
US 2017/0026079 A1    Jan. 26, 2017

(30) Foreign Application Priority Data

Apr. 1, 2014  (KR) .................. 10-2014-0038628
Apr. 1, 2014  (KR) .................. 10-2014-0038629
(Continued)

(51) Int. Cl.
*H04B 3/32*    (2006.01)
*H04L 12/28*   (2006.01)
(Continued)

(52) U.S. Cl.
CPC ................. *H04B 3/32* (2013.01); *H04B 3/54* (2013.01); *H04L 12/2801* (2013.01);
(Continued)

(58) Field of Classification Search
CPC .... H04B 3/32; H04B 3/54; H04B 2203/5425; H04L 12/2801; H04L 12/2834;
(Continued)

(56) References Cited

U.S. PATENT DOCUMENTS 6,611,928 B1 *  8/2003  Fujiyoshi ................ H04L 1/242
                                                  714/715
6,728,248 B1 *  4/2004  Uchida .............. H04Q 11/0478
                                                  370/395.1
(Continued)

FOREIGN PATENT DOCUMENTS

JP    2011193360 A    9/2011
KR    100799587 B1    1/2008
(Continued)

OTHER PUBLICATIONS fastnetnews.com, "G.Fast DSL Has Momentum but G.Hn Networking Wants Some Action", (http://fastnetnews.com/dslprime/42-d/5048-gfast-dsl-has-momentum-but-ghn-wants-some-action), Feb. 24, 2014, 4 pages.
(Continued)

*Primary Examiner* — Chi Tang P Cheng
(74) *Attorney, Agent, or Firm* — Renaissance IP Law Group LLP

(57) ABSTRACT

The present invention relates to a method for synchronized communication in access network applied G.hn technology thereto, access network multiplexer (GAM), an access network terminal (GNT), and access network system using the same, which comprises a plurality of domain masters that communicate with the access network terminal; a clock
(Continued)

controller controlling at least one of speed or output of the signal that the domain master transmits; and an access network terminal which communicates with the access network multiplexer (GAM) connecting the domain masters and G.hn specification physical layer, and at least one of speed or output of the signal that the access terminal transmits is controlled by the clock control unit. The present invention provides efficient data transmission and high bandwidth to service subscribers with applying G.hn technology to conventional coaxial cable or telephone line, thereby reducing crosstalk occurred in data transmission.

8 Claims, 8 Drawing Sheets

(30) Foreign Application Priority Data

| Apr. 1, 2014 | (KR) | 10-2014-0038631 |
|---|---|---|
| Apr. 1, 2014 | (KR) | 10-2014-0038632 |
| Mar. 9, 2015 | (KR) | 10-2015-0032689 |

(51) Int. Cl.
| H04M 11/06 | (2006.01) |
|---|---|
| H04L 12/24 | (2006.01) |
| H04B 3/54 | (2006.01) |
| H04L 12/64 | (2006.01) |
| H04L 12/801 | (2013.01) |
| H04L 5/00 | (2006.01) |

(52) U.S. Cl.
CPC ........ *H04L 12/287* (2013.01); *H04L 12/2834* (2013.01); *H04L 12/2894* (2013.01); *H04L 12/6418* (2013.01); *H04L 41/0672* (2013.01); *H04M 11/062* (2013.01); *H04B 2203/5425* (2013.01); *H04L 5/006* (2013.01); *H04L 5/0046* (2013.01); *H04L 47/10* (2013.01)

(58) Field of Classification Search
CPC ............... H04L 12/287; H04L 12/2894; H04L 12/6418; H04L 41/0672; H04L 5/0046; H04L 5/006; H04L 47/10; H04M 11/062
USPC ........................................................ 370/535
See application file for complete search history.

(56) References Cited

U.S. PATENT DOCUMENTS

| 9,832,107 | B2* | 11/2017 | Pan | H04L 45/28 |
|---|---|---|---|---|
| 2010/0150556 | A1* | 6/2010 | Soto | H04M 19/08 |
| | | | | 398/66 |
| 2014/0328593 | A1* | 11/2014 | Lamb | H04B 10/27 |
| | | | | 398/66 |

FOREIGN PATENT DOCUMENTS

| KR | 20080000090 A | 1/2008 |
|---|---|---|
| KR | 20100029848 | 3/2010 |
| KR | 20110056048 A | 5/2011 |
| KR | 101234102 B1 | 2/2013 |
| KR | 20140004262 | 1/2014 |
| KR | 20140037247 | 3/2014 |

OTHER PUBLICATIONS

International Search Report and Written Opinion for PCT/KR2015/002972 dated Jul. 14, 2015, 16 pages.
International Telecommunication Union, Telecommunication Standardization Sector of ITU, ITU-T G.9960, "Series G: Transmission Systems and Media, Digital Systems and Networks—Unified high-speed wire-line based home networking transceivers—System architecture and physical layer specification," Jan. 2014, 16 pages.
International Telecommunication Union, Telecommunication Standardization Sector of ITU, ITU-T G.9960, "Series G: Transmission Systems and Media, Digital Systems and Networks—Unified high-speed wireline-based home networking transceivers—System architecture and physical layer specification," Jul. 2015, 162 pages.

* cited by examiner

METHOD FOR SYNCHRONIZED COMMUNICATION IN ACCESS NETWORK APPLIED G.HN TECHNOLOGY THERETO, ACCESS NETWORK MULTIPLEXER, ACCESS NETWORK TERMINAL AND ACCESS NETWORK SYSTEM USING THE SAME

BACKGROUND

The present invention relates to a method for synchronized communication in access network applied G.hn technology thereto, and access network multiplexer (also called as a G.hn access multiplexer (GAM) or access multiplexer hereinafter), an access network terminal (also called as a G.hn network terminal (GNT) hereinafter), and an access network system using the method, in more details, which employs G.hn technology for reducing crosstalk among bundle cables by synchronizing the communication between a domain master and an endpoint making use of 20 Hz to 60 Hz clock generated by the G.hn access multiplexer (GAM) in domain synchronization, implementing clock synchronization by designating master and slave with lock, hold over, or free run mode operation between the G.hn access multiplexers (GAMs), and synchronizing each access network terminal (GNT) with 40 ms MAC cycle.

G.hn is described in ITU-G.9960 specification which deals with transmitter and receiver configurations and the physical layer for wired home network. According to FIG. 1, the communication among domains in a home network based on the ITU-T G.hn specifications is performed with the domain master. The domain master allocates and controls resources (e.g. bandwidth, priority, etc.) of all the nodes belonging to the domain. The domain master can have node registration process storing and administering MAC addresses; authentication and control function for joining a node; and monitoring function for observing the entire node in the domain. Additionally, the node belonging to the domain supports registration authentication control protocol and performs receiving and other operations according to the medium access plan (MAP).

In addition, the G.hn utilizes a single pair of power line, coaxial cable, unshielded twisted pair (UTP) line, or phone line but in the access network it consists of more than one pair of bundles. Hence, by applying the G.hn (ITU-T 9960, 9961) for home networking to the access network utilizing conventional cable or phone line, the maximum bandwidth of the network can be increased up to 1 Gbps.

Therefore, when the G.hn technology is applied to the access network, a concentration equipment (Central Office, CO) and a terminal (Customer Premises Equipment, CPE) are connected with a bundle cable; in this case the crosstalk occurred at the bundle cable can disturb the communications. Additionally, since the G.hn is based on half duplex or best-effort mechanisms and unable to adjust the bandwidth for each port, it is required to set up the bandwidth for each port to apply service level agreement (SLA) in the access network employing the G.hn technology.

SUMMARY

The objective of the present invention is to provide a method for synchronized communication in access network applied G.hn technology thereto in which the communication between the domain master and the end-point is synchronized so that the crosstalk among bundle cables is reduced, and access network multiplexer (GAM), an access network terminal (GNT), and an access network system using the method.

Another objective of the present invention is to provide the maximum bandwidth up to 1 Gbps by applying the G.hn (ITU-T 9960, 9961) for home networking to the access network utilizing conventional cable or phone line.

Another objective of the present invention is to eliminate Near End CrossTalk (NEXT) phenomenon in the bundle by utilizing synchronization clock signal when applying the G.hn technology to the access network.

According to a feature of the present invention to achieve the objectives described as above, the access network concentration equipment employing the G.hn specification includes a domain master which is a collection of G.hn nodes replacing the port and communicates with access network terminal (GNT), and a switch that connects the physical layer of G.hn specification with the said multiple domain masters; the said domain master is connected to the end-point replacing the said terminal (GNT) with a bundle cable, and is synchronized at the pre-determined frequency less than 10 kHz and communicates to reduce the crosstalk in the bundle cable.

According to another feature of the present invention, the access network terminal employing the G.hn specification is connected to the domain master which is a collection of G.hn nodes replacing the port of the G.hn access multiplexer with a bundle cable; is mapped one-to-one with each domain master; is synchronized at the pre-determined frequency less than 10 kHz and communicates; and is replaced by the end-point based on the G.hn specification.

According to another feature of the present invention, the access network system employing the G.hn specification includes the multiple G.hn access multiplexer consisting of a master and a slave that are mutually connected with a uplink and exchange synchronization signal, and the access network terminal that communicates at the allocated time frame from the G.hn access multiplexer based on the synchronization signal; the G.hn access multiplexer includes a domain master that is a collection of G.hn nodes replacing the port and communicates with the said access network terminal and a switch that connects a physical layer employing the G.hn specification to multiple of the said domain masters, and connects the said domain master and the physical layer employing the G.hn specification; the said access network terminal is replaced by the end-point employing the G.hn specification which is mapped one-to-one with the said domain master and connected to the said domain master with a bundle cable, and is synchronized at the pre-determined frequency less than 10 kHz and communicates.

According to another feature of the present invention, the method for synchronized communication in access network employing G.hn technology includes a phase in which each domain master in the first G.hn access multiplexer receives a synchronization signal from a clock controller; a phase in which the said domain master identifies the current time frame based on the said synchronization signal; and a phase in which the said domain master sends signal in case the said current time frame coincides with the time frame for its identifier.

According to the present invention, by applying G.hn technology to the access network utilizing the conventional coaxial cable or telephone line it provides service subscribers with efficient data transmission based on higher bandwidth and reduces crosstalk in transferring data.

BRIEF DESCRIPTION OF THE DRAWINGS

For more complete understanding of this disclosure, reference is now made to the following brief description, taken in connection with the accompanying drawings and detailed description.

DETAILED DESCRIPTION

Hereinafter, the method for synchronized communication in access network employing G.hn technology, and the access multiplexer (or G.hn access multiplexer), the access network terminal, and the access network system using the method in accordance with the present invention are explained in detail with reference to the accompanying figures. Line widths of figures or sizes of constituent components in the figures may be excessively exaggerated for the purpose of clear explanation and convenience. In addition, the terms descried below are defined considering the functionalities in the present invention so that they are differently used depending upon the intention of user or operator or the convention. Therefore, the definitions for those terms are used considering the entire content of this specification.

The method for synchronized communication in access network and the system in the present invention can be implemented in the access network environments employing G.hn specification in which multiple ports are connected to a G.hn access multiplexer performing the functions of a domain master (DM), and the said domain master (DM) is connected to multiple terminals (GNT) performing the functions of end-point (EP) which comprises a G.hn domain, with a bundle cable.

Figure 1:
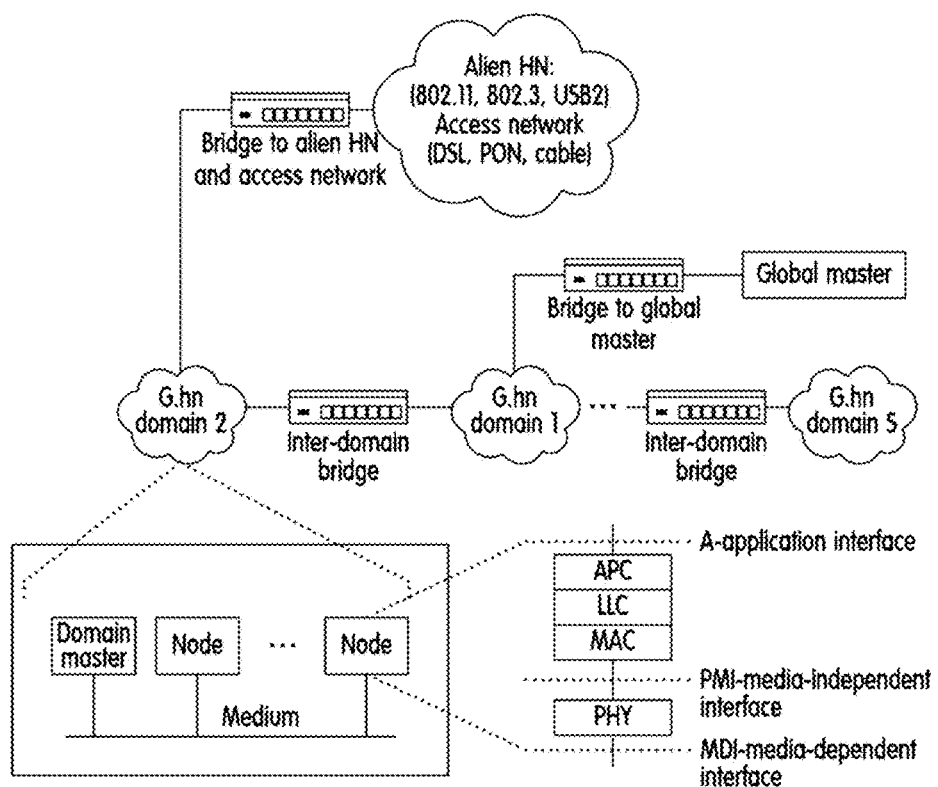
FIG. 1 shows a conceptual diagram for displaying the configuration of a general G.hn specification.
Figure 2:
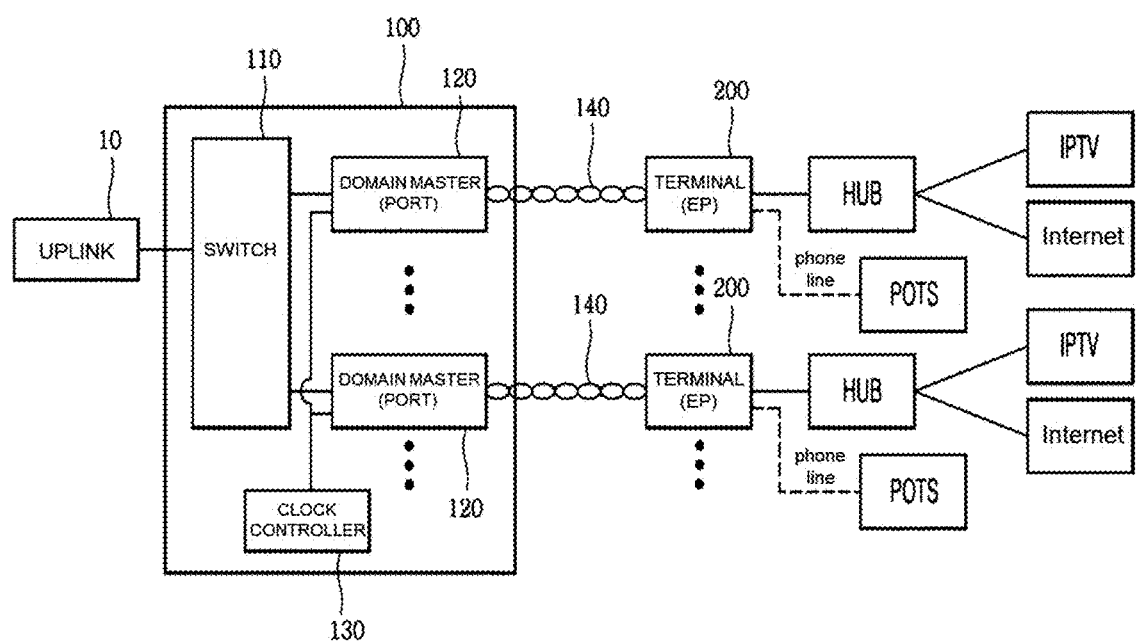
FIG. 2 shows a block diagram for the access network employing the G.hn specification in accordance with an embodiment of the present invention.

FIG. 2 is a block diagram for the access network employing the G.hn specification in accordance with an embodiment of the present invention. The present invention can be applied to both optical access network and DSL access network based on the phone line according to the communication medium. In FIG. 2, an embodiment of the present invention illustrates a DSL access network based on the phone line.

As shown in FIG. 2, in order to apply the G.hn specification to the access network utilizing a phone line and provide the maximum bandwidth more than 1 Gbps, the access network system employing G.hn specification in accordance with an embodiment of the present invention includes G.hn access multiplexer (GAM, or concentration equipment) 100 in which multiple ports function as domain masters; G.hn network terminal (GNT, or terminal) 200 replaced by the end-point employing G.hn specification; and the phone line that connects the domain master and the end-point with a bundle cable 140.

The G.hn access multiplexer (GAM) 100, which is a collection of G.hn nodes includes a domain master 120 replacing a port and communicating with a terminal (GNT) 200; a switch 110 which connects to multiple domain masters (120) and physical layers employing G.hn; and an uplink 10. The uplink 10 is installed at the inside or the outside of the G.hn access multiplexer (GAM) 100; and can be connected to optical line termination (OLT) equipment in case of FTTH based access network or L3 aggregation switch in case of DSL based access network.

The terminal (GNT) 200 is connected to the domain master 120 which is a collection of G.hn nodes replacing the ports of the G.hn access multiplexer (GAM) 100 with a bundle cable and is synchronized at the pre-determined frequency less than 10 kHz and communicates; and can be replaced by the end-point employing G.hn specification. The domain master 120 and the GNT 200 should be synchronized at the frequency less than 10 kHz in case that the domain master 120 and the GNT 200 communicate at the bandwidth of 1 Gbps. For example, the synchronization frequency can be from 20 Hz to 60 Hz (specifically 25 Hz to 50 Hz).

As described before, the present invention features the clock synchronization at a pre-determined frequency to reduce the crosstalk of G.hn interference. If the clock synchronization is not used, a serious trouble may happen because different lines in the bundle cable of the access network are misidentified with the same lines due to the crosstalk in the adjacent lines.

To reduce the interference between the adjacent ports, scheduling the transmission times between upstream and downstream can reduce the interference. However, the bandwidth for data transmission is determined by the speed of synchronization clock so that the time used for the synchronization clock is limited. The speed of synchronization clock is increasingly important in order to provide gigabit service and furthermore to use copper line for send the synchronization clock between the equipment devices.

Figure 3:
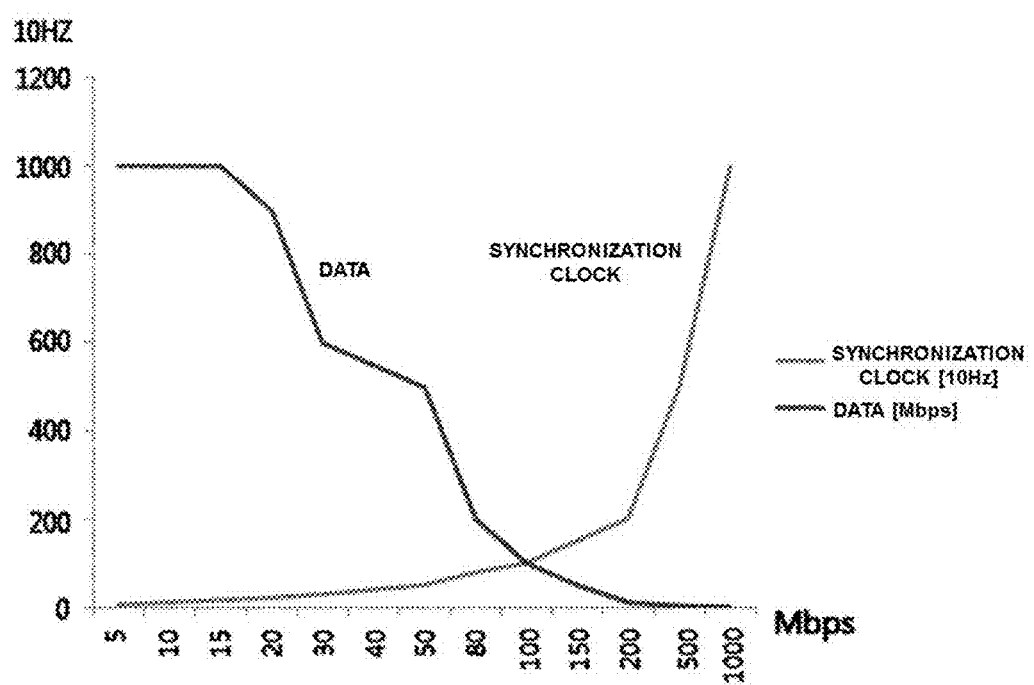
FIG. 3 shows a graph for the data transmission speed measured at the bundle cable based on the synchronization clock frequency according to the present invention.

The synchronization clock for access network equipment employing G.hn technology can be chosen between tens of Hz and tens of kHz. FIG. 3 shows measurement result of the data transfer rates at a bundle cable with regard to the synchronization clock frequency. The x-axis represents the data transfer rate and the y-axis does the synchronization clock. If the synchronization clock frequency exceeds 10 kHz bandwidth, the G.hn technology cannot form a link so that data cannot be sent or received.

Therefore, the synchronization clock frequency should be chosen from 25 Hz to 200 Hz (more specifically, 25 Hz to 50 Hz for the optimum value) to provide the maximum performance for the G.hn technology in the present invention.

Meanwhile, the G.hn access multiplexer (GAM) 100 is located at the network operator's side and the terminal (GNT) 200, physically connected to the G.hn access multiplexer (GAM) 100 as a terminal device of it, can be located at a user's or a service subscriber's side. For example, the G.hn access multiplexer (GAM) 100 is connected with the terminal (GNT) 200 via a phone line. The G.hn access multiplexer (GAM) 100 is connected to an uplink and comprises a switch 110 and multiple ports. The uplink 10 is connected with the communication devices in the upper layer and the multiple ports are connected with a terminal (GNT) 200 respectively via a phone line, CPEV, F/S. TIV, UTP, or etc.

Meanwhile, in order to apply G.hn technology to the access network consisting of the G.hn access multiplexer (GAM) 100 and the terminal (GNT) 200, each port is replaced by the domain master 120 to perform the role of domain master employing G.hn specification and each terminal (GNT) 200 can be replaced by the end-point (EP) to perform the role of end-point employing G.hn specification. Hence, the domain master can form a G.hn domain on network consisting of a domain master 120 and terminals (GNT) 200 replaced by multiple end-points connected with the domain master.

Figure 4:
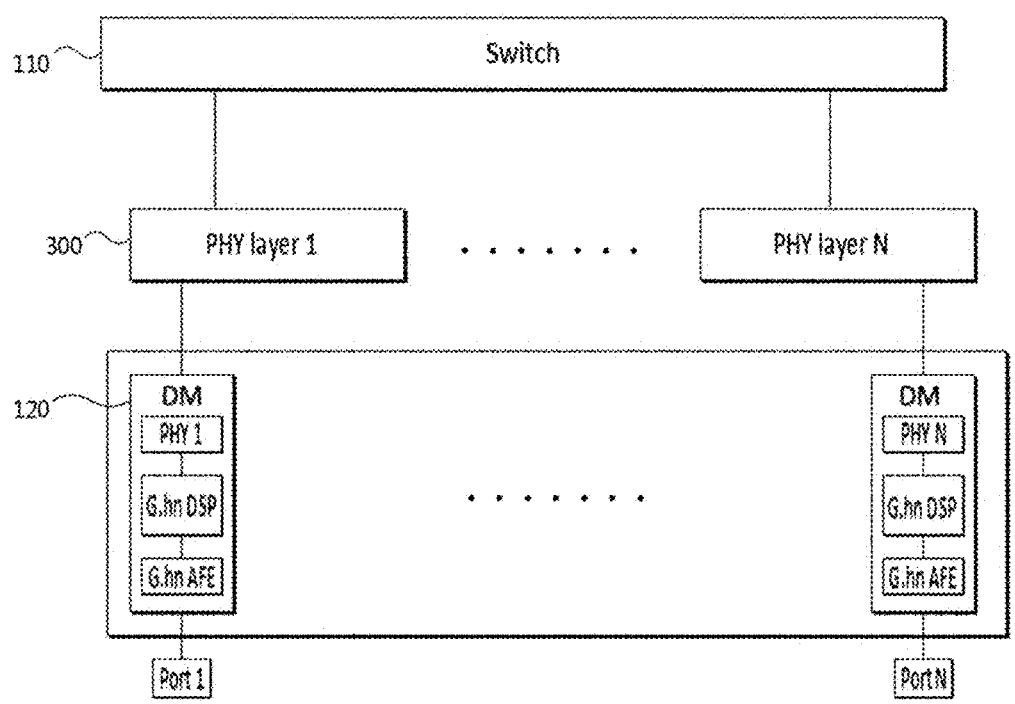
FIG. 4 shows a configuration diagram for displaying the connection between a switch and a physical layer and the mixed configuration of the switch and G.hn specification in the access network employing the G.hn specification according to the present invention.

FIG. 4 is a configuration diagram for displaying the connection between a switch and a physical layer and the mixed configuration of the switch and G.hn specification in the access network employing the G.hn specification according to the present invention.

Referring to the FIG. 4, the G.hn access multiplexer (GAM) 100 comprises a switch 110 which connects N domain masters and provides synchronization signal, N physical layers 300 (PHY1 or PHY N) connected to the switch 110, and a domain master 120 consisting of N ports (Port 1 or Port N).

At this moment, the switch 110 can change one 1 GE (Gigabit Ethernet) or 10 GE into multiple G.hn or 1 GE. For example, the switch 110 can change one 1 GE (Gigabit Ethernet) or 10 GE into twenty four 1 GE.

In addition, the switch 110 can be connected with more than one PHY and octal PHY can use SGMI or QSMII interface. Meanwhile, one PHY can be connected to multiple domain masters 120 or eight domain masters, for example.

In addition, the domain master 120 can contain G.hn digital signal processor module (DSP module, not shown in the FIG. 4) and G.hn analog front-end (AFE, not shown in the FIG. 4). In other words, the domain master 120 can comprise 1 GE PHY, G.hn DSP, and G.hn AFE.

Preferably the domain master 120 can be connected to a port to reduce crosstalk at an output port and the port can use a connector equivalent to a RJ45 connector.

Here, the domain master 120 is connected to end-point with a bundle cable and is synchronized at the pre-determined frequency less than 10 kHz and communicates to reduce the crosstalk in the bundle cable. Additionally, each domain master 120 has its own identifier and is connected with the end-point having the same identifier. At the same time, the identifier represents one of the time frames determined by synchronization signal.

The present invention includes a G.hn access multiplexer (GAM) 100 generating synchronization clock and a clock controller 130 to implement domain synchronization between G.hn access multiplexer (GAM) 100 devices or terminals (GNT) 200 reciprocally. For example, the clock controller 130 sends synchronization signal at the pre-determined frequency less than 10 kHz to each domain master 120 and the domain master 120 communicates with the terminal (GNT) 200 connected to it when its own specific identifier coincides with the time frame determined by the current synchronization signal. In other words, the domain master 120 and the terminal (GNT) 200 communicate with each other by the time division multiplexing (TDM) method.

Figure 5:
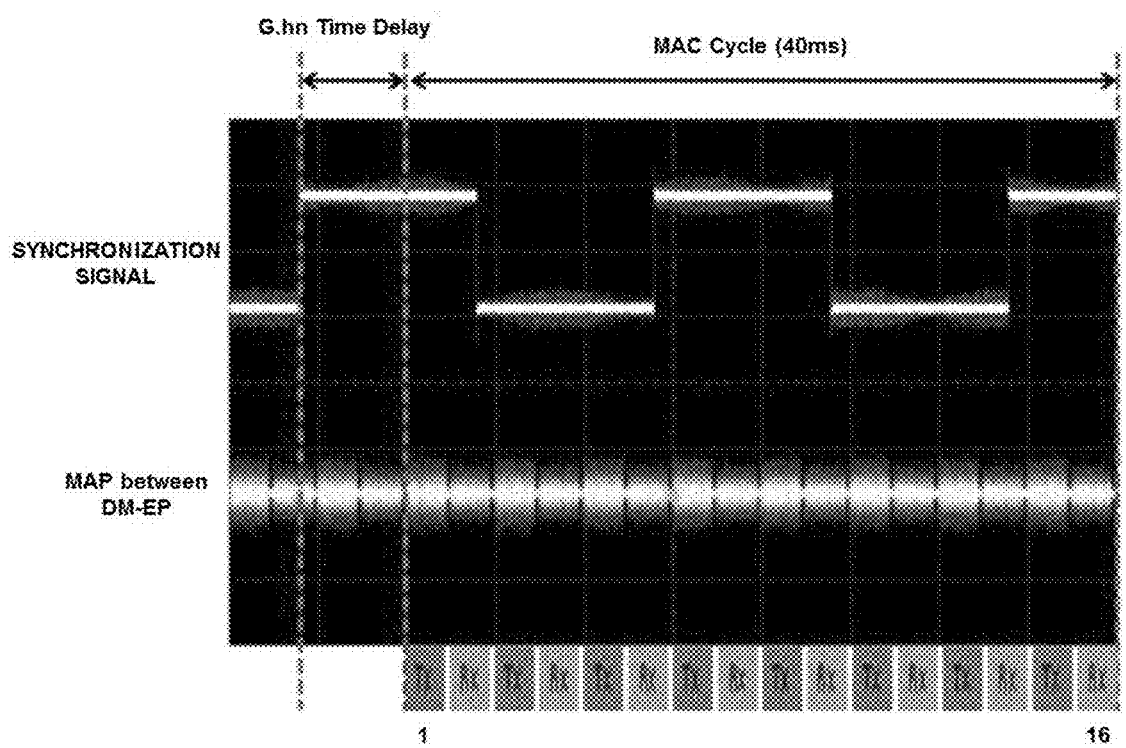
FIG. 5 shows a diagram for displaying the time frame in which each domain master sends and receives based on the synchronization signal according to the present invention.

FIG. 5 is a diagram for displaying the time frame in which each domain master sends and receives based on the synchronization signal.

As shown in FIG. 5 in which synchronization signal at 50 Hz is transferred to the domain master 120, periods of the synchronization signal are divided into multiple time frames; in case of FIG. 5, one period of the synchronization signal is divided into 4 time frames and more than one domain master 120 can send or receive at the time frame. A switch 110 can connect eight domain masters 120 and therefore the eight domain masters connected to the switch 110 send and receive during two periods of the synchronization signal and the two periods form a MAC cycle.

As described earlier, the domain master 120 in an embodiment of the present invention replaces each port of the G.hn access multiplexer (GAM) 100 and the G.hn access multiplexer (GAM) 100 can use a switch 110 changing one 1 GE or 10 GE into twenty-four 1 GE. In this case, one G.hn access multiplexer device (GAM) 100 provides 24 ports. Therefore, maximum 24 domain masters (120) in the G.hn access multiplexer (GAM) 100 are connected to each terminal (GNT) 200. Since the domain masters 120, however, communicate with the terminal (GNT) 200 using the time division multiplexing to reduce crosstalk, each domain master 120 communicates at assigned parts of the MAC cycle defined by the synchronization signal transferred by the switch 110. Therefore, each domain master 120 is assigned with a time frame having 1/24 of the MAC cycle in the worst case.

However, the time for the domain master 120 to send data to the terminal (GNT) 200 is limited due to the limitation of processing speed in the G.hn DSP module (not shown). Thus the time frame assigned to each domain master 120 should be enough for the domain master 120 to send and receive data to the terminal (GNT) 200 and this time frame is determined by the period of the said synchronization signal. Considering the current domain master 120 and the performance of the contained G.hn DSP module in it, it is possible to obtain enough time for the domain master 120 to send and receive data and to reduce crosstalk between the domain master and the terminal (GNT) 200 as much as possible.

Figure 8:
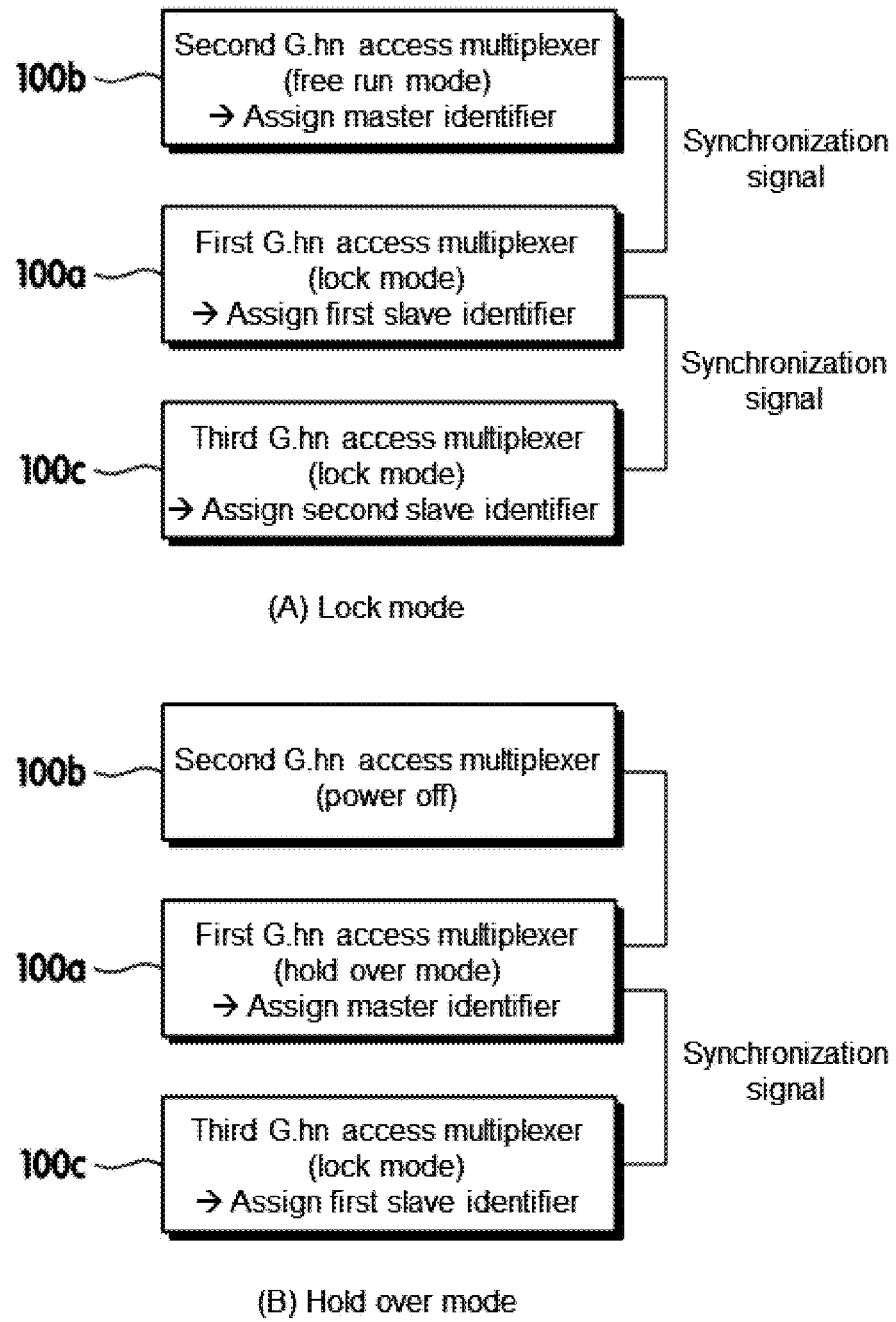
FIG. 8 shows a diagram for explaining clock synchronization among multiple G.hn access multiplexer (GAM) in the access network employing G.hn specification in accordance with an embodiment of the present invention.

Referring to (A) of FIG. 8 at the same time, multiple G.hn access multiplexer 100a, 100b, 100c connected in master and slave mode send and receive synchronization signal and operate in synchronized mode; and the master send synchronization signal to the slave and the slave operates according to the synchronization signal of the master. As such, the operation of the whole access network is stabilized by agreeing with the synchronization signal of multiple G.hn access multiplexer 100a, 100b, 100c.

Here, the clock controller 130 of the first G.hn access multiplexer 100a receives synchronization signal from the second G.hn access multiplexer 100b and transfers it to the domain master 120 and the first G.hn access multiplexer 100a operates in lock mode with the second G.hn access multiplexer 100b. In this case, the second G.hn access multiplexer 100b plays the role of master and the first G.hn access multiplexer 100a does the role of slave. At this time, the clock controller 130 receives 20 Hz to 60 Hz synchronization signal from the master, the second G.hn access multiplexer 100*b*, during the initialization process;

periodically receives synchronization signal from the master; and operates in lock mode synchronized with the received signal having 20 Hz or 60 Hz from the master. In other words, the first G.hn access multiplexer 100*a* and the second G.hn access multiplexer 100*b* use the same synchronization signal having 20 Hz to 60 Hz to communicate with the terminal (GNT) 200, respectively. Here the G.hn access multiplexer 100*b* generating the synchronization clock operates in free-run mode.

Referring to (B) of FIG. 8, the clock controller 130 in the first G.hn access multiplexer 100*a* can operate in free-run mode and generate synchronization signal using the internal clock when the first G.hn access multiplexer 100*a* does not receive synchronization signal from the second G.hn access multiplexer 100*b* during the initialization process. In other words, the free-run mode refers the operating condition in which the first G.hn access multiplexer 100*a* operates with synchronization signal generated by it based upon the internal clock, not with the received external synchronization signal.

Furthermore, when the clock controller 130 of the first G.hn access multiplexer 100*a* does not receive the synchronization signal while operating in lock mode with the second G.hn access multiplexer 100*b* and sending synchronization signal to the third G.hn access multiplexer 100*c*, it changes into hold-over mode in which it receives synchronization signal generated based on the internal clock of the third G.hn access multiplexer 100*c*. In other words, the first G.hn access multiplexer 100*a* as a master is connected to the third G.hn access multiplexer 100*c* as a slave; in this case the first G.hn access multiplexer 100*a* sends the received synchronization signal from the second G.hn access multiplexer 100*b* to the third G.hn access multiplexer 100*c* and all the three G.hn access multiplexer 100*a*, 100*b*, 100*c* operate in lock mode according to the same synchronization signal at 20 Hz to 60 Hz.

When the first G.hn access multiplexer 100*a* does not receive the synchronization signal due to the failure of the second G.hn access multiplexer 100*b* caused by malfunction or power loss while operating in lock mode, it changes into hold-over mode in which the slaves of it operate based on the synchronization signal generated with its own internal clock. In hold over mode, the first G.hn access multiplexer 100*a* operates with the synchronization signal generated by it based on the internal clock and the third G.hn access multiplexer 100*c*, a slave of the first G.hn access multiplexer 100*a*, receives the synchronization signal generated by the first G.hn access multiplexer 100*a* and operates according to the signal. As such, operating in hold-over mode in case of failure of the master or the second G.hn access multiplexer 100*b* minimizes the shift in the clock synchronization between the master (the first G.hn access multiplexer 100*a* or the third G.hn access multiplexer 100*c*) and maximizes the operation time for the entire network to work properly despite the malfunction of the G.hn access multiplexer (GAM) in the network.

At the same time, in order to communicate the first G.hn access multiplexer 100*a* and the terminal (GNT) 200, each domain master 12 and the terminal (GNT) 200 to communicate with the domain master should be given the same identifier; the identifier can be differently given accordingly whether the G.hn access multiplexer 100 operates as a master or a slave or whether it operates as the master of other G.hn access multiplexer 100 and the slave at the same time.

In this case, when the G.hn access multiplexer (GAM) 100 operates as a master (e.g. the second G.hn access multiplexer or a slave (e.g. the third G.hn access multiplexer), it has the master identifier or the second slave identifier; when the G.hn access multiplexer operates as a master of other G.hn access multiplexer and a slave at the same time (e.g. the first G.hn access multiplexer), it has the first slave identifier.

For example, when the first G.hn access multiplexer 100*a* operates as a master, namely the first G.hn access multiplexer 100*a* does not receive synchronization signal from the second G.hn access multiplexer 100*b* and sends synchronization signal to the third G.hn access multiplexer 100*c*, it has a specific master identifier. When the first G.hn access multiplexer 100*a* operates as a master and a slave at the same time for the other G.hn access multiplexer 100*c*, 100*b*, namely the first G.hn access multiplexer 100*a* receives synchronization signal from the second G.hn access multiplexer 100*b* and sends synchronization signal to the third G.hn access multiplexer 100*c*, it has a specific identifier as the first slave.

When the first G.hn access multiplexer 100*a* operates as a slave only, namely the first G.hn access multiplexer 100*a* receives synchronization signal from the second G.hn access multiplexer 100*b* and does not send synchronization signal to the third G.hn access multiplexer 100*c*, it has a specific identifier as the second slave. Furthermore, each identifier is determined by the region of the identifier that the first G.hn access multiplexer 100*a* has and therefore the identifiers for the first G.hn access multiplexer 100*a* as a master and the first G.hn access multiplexer 100*a* as a slave can belong to different regions. If the first G.hn access multiplexer 100*a* has a master identifier, the identifier for the domain master of the first G.hn access multiplexer 100*a* belongs to the first region; and if the first G.hn access multiplexer 100*a* has the first slave identifier, the identifier for the domain master of the first G.hn access multiplexer 100*a* belongs to the second region; and if the first G.hn access multiplexer 100*a* has the second slave identifier, the identifier for the domain master of the first G.hn access multiplexer 100*a* belongs to the third region. At this time, the first or the third region cannot have the shared region and the first G.hn access multiplexer 100 can have different identifiers when it operates as a master, the first slave, or the second slave, respectively.

If all the G.hn access multiplexer 100*a*, 100*b*, 100*c* has a master identifier, the master identifier is specific to each G.hn access multiplexer (GAM); and if all the G.hn access multiplexer 100*a*, 100*b*, 100*c* has the first or the second identifier, the first or the second identifier is specific to each G.hn access multiplexer (GAM). In other words, if the domain master of all the G.hn access multiplexer (GAM) in the access network has an identifier in the first region, the identifier in the first region is specific to each G.hn access multiplexer (GAM); and if the domain master of all the G.hn access multiplexer (GAM) in the access network has an identifier in the second or the third region, the identifier in the second or the third region is specific to each G.hn access multiplexer (GAM).

If different G.hn access multiplexer (GAM) have the identical master or slave identifier, the identifiers of the domain master 120 from different G.hn access multiplexer (GAM) collide with each other so that the connection between the domain master 120 and the terminal (GNT) 200 cannot happen. Thus applying different identifiers to the domain masters according to the operation of all the G.hn access multiplexer (GAM) can prevent collision between the identifiers of the domain master 120.

The synchronization between the G.hn access multiplexer (GAM) and the terminal (GNT) 200 is different from the mutual synchronization between the G.hn access multiplexer (GAM) 100a, 100b, 100c described earlier. In this case the terminal (GNT) 200 communicating with the G.hn access multiplexer (GAM) 100 is synchronized without sending or receiving clock signal from the domain master but it can communicate with the domain master in at least one of the transmission opportunities (TXOP), which are multiple division of one period of the synchronization frequency with the domain master 120. Hence the synchronization signal is transferred among the G.hn access multiplexer (GAM) 100a, 100b, 100c according to the master/slave relationship but the synchronization signal is not transferred between the domain master 120 and the terminal (GNT) 200. Therefore, the domain master 120 and the terminal (GNT) 200 can use handshaking technology, for example, to correctly communicate each other without sending or receiving synchronization signal.

At this time the terminal (GNT) 200 and the domain master 120 can use protocols to communicate with the domain master using the said transmission opportunities. The protocols include the said handshaking technology to communicate without sending or receiving synchronization signal. Additionally, an example of these protocols is TXOP protocol.

For example, in TXOP protocol, the G.hn network uses synchronized medium access based on the master and slave configuration of the G.hn access multiplexer (GAM). At this time, the time period of synchronized access is called MAC cycle and one MAC cycle includes multiple transmission opportunities and media access plan (MAP). The domain master periodically broadcasts a MAP message containing allocation information of the next MAC cycle. Using the MAC cycle, the domain master divides a MAC cycle into multiple transmission opportunities and the transmission opportunities have contention free TXOP (CFTXOP) or shared TXOP (STXOP). CFTXOP is used for time division multiple access (TDMA) mode in which only one node can transmit data during the corresponding TXOP while STXOP is used by a group of connected nodes for token passing or carrier sense multiple access (CSMA) mode.

At the same time, each terminal (GNT) 200 uses at least one of bit loading or forward error correction (FEC) dynamically and performs bit loading or forward error correction under 100 milliseconds. Namely, by performing bit loading or forward error correction in a very short time period in the order of several milliseconds, the far end crosstalk among multiple terminals (GNT) connected with a shared bundle cable is reduced.

In addition, selective retransmission is also used to guarantee preventing packet loss despite the rear crosstalk or noise. The terminal (GNT) 200 can use a large buffer to save enough signals transmitted during a long time of noise more than tens of milliseconds to cope with noise and crosstalk. Additionally, the terminal (GNT) 200 can implement an optimal performance despite the rear crosstalk using the design tool for the neighbor network environments (NDIM).

Figure 6:
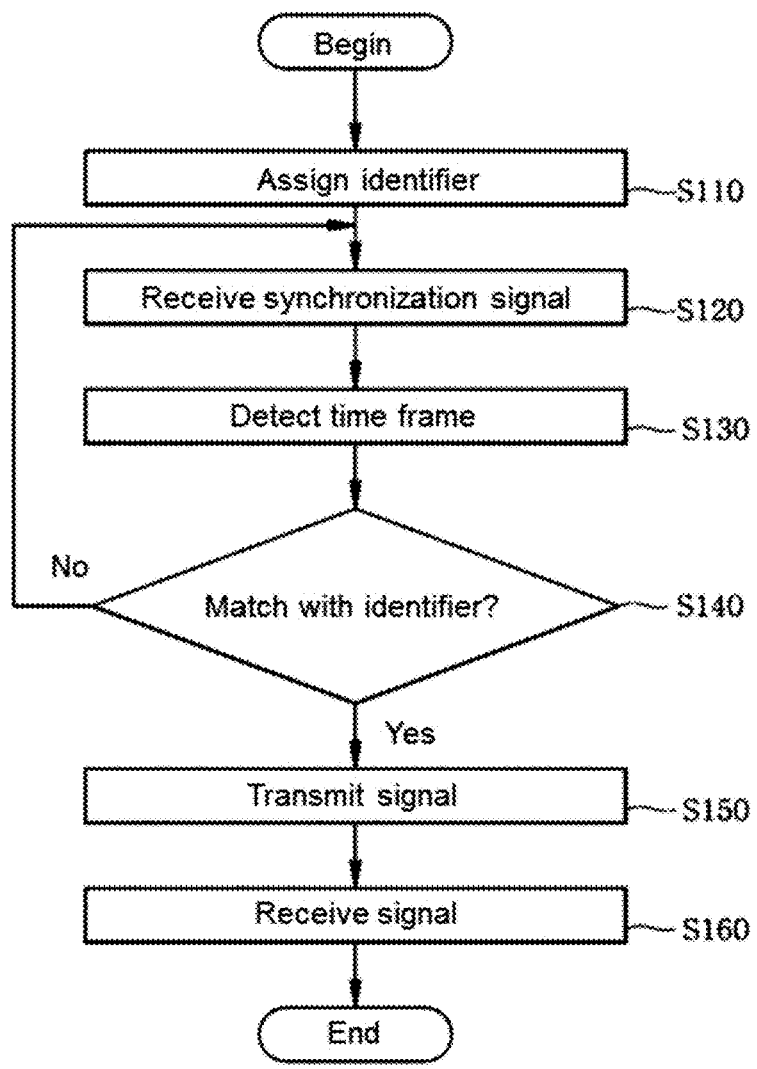
FIG. 6 shows a flow chart for illustrating operations of the synchronized communication method in the access network employing G.hn specification in accordance with an embodiment of the present invention.

FIG. 6 is a flow chart for illustrating operations of the synchronized communication method in the access network employing G.hn specification. Referring to the figure, the synchronized communication method is explained in accordance with an embodiment of the present invention.

Firstly, the first G.hn access multiplexer 100a is given among a master identifier, the first slave identifier, or the second slave identifier and the identifiers for the domain master 120 and the terminals (GNT) 200 connected to the domain master are given according to the said identifier (S110).

At this time, when the first G.hn access multiplexer 100a does not receive synchronization signal from the second G.hn access multiplexer 100b and sends synchronization signal to the third G.hn access multiplexer 100c, it has a specific master identifier; when the first G.hn access multiplexer 100a receives synchronization signal from the second G.hn access multiplexer 100b and does not send synchronization signal to the third G.hn access multiplexer 100c, it has a specific identifier as the second slave and the identifier of the domain master 120 is determined based on the assigned identifier among the said master identifier, the first slave identifier, and the second slave identifier.

In addition, if all the G.hn access multiplexer (GAM) has a master identifier, the master identifier is specific to the G.hn access multiplexer (GAM); and if the G.hn access multiplexer (GAM) has the first slave identifier or the second slave identifier, the first and the second identifiers are specific to the G.hn access multiplexer (GAM).

Accordingly, different identifiers are assigned to all the G.hn access multiplexer (GAM) according to the operation as a master or a slave in order to prevent connection problem between the domain master 120 and the terminal (GNT) when different G.hn access multiplexer (GAM) have the identical master or slave identifier and the identifiers of the domain master 120 from different G.hn access multiplexer (GAM) collide with each other and in order to prevent collision between the identifiers of the domain master 120. The assignment of the identifier region or the identifier can be carried out during initialization of the G.hn access multiplexer (GAM) or installation of the access network.

Next, each domain master 120 of the first G.hn access multiplexer 100a receives synchronization signal from the clock controller 130 (S120). At this time, the clock controller 130 can receive the synchronization signal from other G.hn access multiplexer 100b in the uplink 10 of the access network; in this case, the first G.hn access multiplexer 100a receiving the synchronization signal operates as a slave and the second G.hn access multiplexer 100b sending the synchronization signal does as a master and the two equipment are synchronized. As described earlier the synchronization signal is a signal at the pre-determined frequency less than 10 kHz to reduce crosstalk in a bundle cable and to enable communication between the domain master 120 and the terminal (GNT) 200. In addition, the switch 110 can change one 1 GE or 10 GE into multiple G.hn or 1 GE, for example, twenty-four 1 GE.

Next, the domain master 120 detects the current time frame based on the synchronization signal (S130). In other words, the domain master 120 can identify the time frames divided by the synchronization signal. Then the domain master 120 compares the detected current time frame with the time frame designated by its identifier and decides whether the current time frame coincides with its identifier or it can communicate with the terminal (GNT) 200 during the current time frame (S140). If the current time frame does not coincide with its identifier, the current time frame cannot be used for the corresponding domain master 120 and the terminal (GNT) 200 to communicate and the domain master 120 repeats the said steps (S120) through (S140) and wait for the time frame coinciding with its identifier.

If the current time frame coincides with the time frame designated by its identifier in the said step (S140), the next step (S150) is performed and the domain master 120 and the terminal (GNT) 200 can communicate each other. At this time the domain master 120 sends signal to the terminal (GNT) 200 at the first half of the current time frame as describer before (S150). Then the domain master 120 receives signal from the terminal (GNT) 200 at the second half of the current time frame (S160) and communicates with the terminal (GNT) 200 after terminating the process. In conclusion, the domain master 120 can transmit signal when the current time frame coincides with its identifier.

Figure 7:
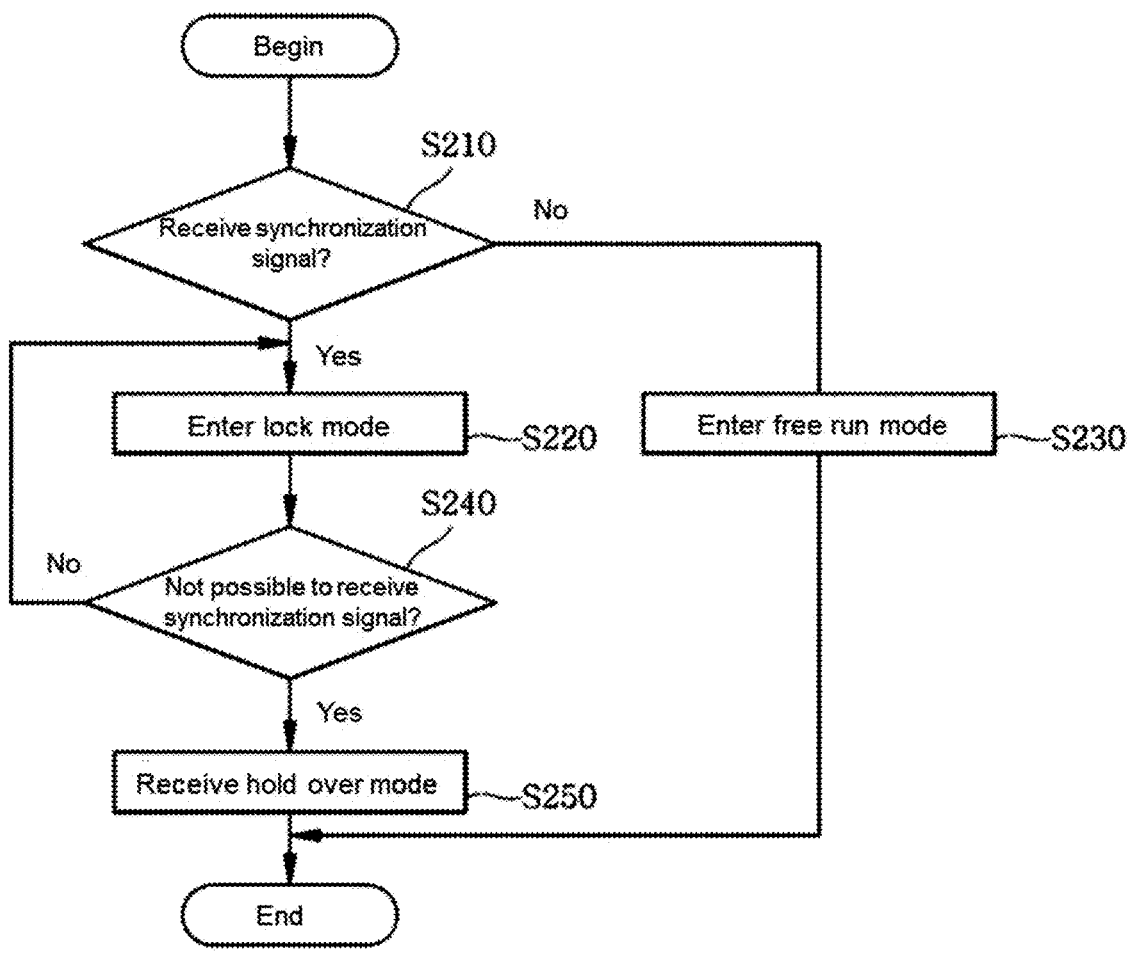
FIG. 7 shows a flow chart for illustrating operations of the G.hn access multiplexer (GAM) in the access network employing G.hn specification in accordance with an embodiment of the present invention.

FIG. 7 is a flow chart for illustrating selection of operating modes of the G.hn access multiplexer (GAM) in the access network employing G.hn specification in accordance with an embodiment of the present invention and FIG. 8 is a diagram for explaining clock synchronization among multiple G.hn access multiplexer (GAM) in the access network employing G.hn specification in accordance with an embodiment of the present invention.

Referring to FIG. 7, multiple G.hn access multiplexer 100*a*, 100*b*, 100*c* connected in master and slave mode send and receive synchronization signal and operate in synchronized mode as described earlier. In FIG. 8 one G.hn access multiplexer (GAM) 100 as a master is connected with one G.hn access multiplexer (GAM) 100 as a slave but one G.hn access multiplexer (GAM) 100 as a master can be connected to multiple G.hn access multiplexer (GAM) 100 as slaves depending on an implementation and the G.hn access multiplexer (GAM) 100 operating as a slave can be additionally connected to a single or multiple of G.hn access multiplexer (GAM) operating as slaves. Depending on the embodiment of the present invention, the number of G.hn access multiplexer (GAM) communicating with each other may vary and, for example, seven G.hn access multiplexer (GAM) 100 devices can send and receive synchronization signal and operate as a master and a slave.

As shown in FIG. 7, at the initialization step of the G.hn access multiplexer (GAM) 100, the first G.hn access multiplexer 100*a* decides first whether it can receive synchronization signal from the second G.hn access multiplexer 100*b* (S210). If it receives synchronization signal, then the first G.hn access multiplexer 100*a* enters lock mode with the second G.hn access multiplexer 100*b* (S220) and operates according to the synchronization signal received from the second G.hn access multiplexer 100*b*. In case it cannot receive synchronization signal from the second G.hn access multiplexer 100*b*, the first G.hn access multiplexer 100*a* enters free-run mode (S230) in which it operates according to the synchronization signal generated by the internal clock, and terminates the process. For example, when the second G.hn access multiplexer 100*b* as shown in (A) of FIG. 8 selects operating mode by the process shown in FIG. 7, it enters free-run mode at the initialization step because it cannot receive synchronization signal from other G.hn access multiplexer (GAM) anyway.

While the first G.hn access multiplexer 100*a* operates in lock mode, it decides whether it can receive synchronization signal from the second G.hn access multiplexer 100*b* (S240). If the first G.hn access multiplexer 100*a* operates as a slave to the second G.hn access multiplexer 100*b* and as a master to the third G.hn access multiplexer 100*c*, then the first G.hn access multiplexer 100*a* sends synchronization signal to the third G.hn access multiplexer 100*c*. In the example shown in (A) of FIG. 8, for example, the first G.hn access multiplexer 100*a* operating in lock mode with the second G.hn access multiplexer 100*b* sends synchronization signal received from the second G.hn access multiplexer 100*b* to the third G.hn access multiplexer 100*c* and the third G.hn access multiplexer 100*c* operates in lock mode with the second G.hn access multiplexer 100*b*.

If the first G.hn access multiplexer 100*a* decides that it cannot receive synchronization signal in the above step (S240) or if it cannot receive synchronization signal operating in lock mode, the first G.hn access multiplexer 100*a* enters hold-over mode (S250) in which it sends synchronization signal generated by the internal clock of the third G.hn access multiplexer 100*c*. When the second G.hn access multiplexer 100*b* shown in (A) of FIG. 8 is powered off, for example, the first G.hn access multiplexer 100*a* enters hold-over mode since it cannot receive the synchronization signal from the second G.hn access multiplexer 100*b* as shown in (B) of FIG. 8 and in the hold-over mode, it operates according to the synchronization signal generated based on the internal clock and sends the generated synchronization signal by itself to the slave, the third G.hn access multiplexer 100*c*.

If the first G.hn access multiplexer 100*a* can receive synchronization signal in the above step (S240), it repeats the step (S220) and continuously operates in lock mode.

As such, operating in hold-over mode in case of failure of the master or the second G.hn access multiplexer 100*b* minimizes the shift in the clock synchronization between the master (the second G.hn access multiplexer 100*b*) and the slaves (the first G.hn access multiplexer 100*a* or the third G.hn access multiplexer 100*c*) and maximizes the operation time for the entire network to work properly despite the malfunction of the G.hn access multiplexer (GAM) in the network.

According to the present invention as described before, the G.hn technology can be applied to the access network using the conventional copper cable or phone line to provide efficient data transmission with higher bandwidth to service subscribers and to reduce crosstalk in data transmission.

The present invention has been described with reference to an embodiment shown in the figures, which is an exemplification only and the various and equivalent embodiments are made possible by those who have ordinary knowledge in the area the present invention belongs to. Therefore, the technical scope of the present invention will be determined by the claims as follows.

What is claimed is:
1. An access multiplexer configured to comprise:
a plurality of domain masters;
a switch configured to connect to each of the plurality of domain masters; and
a clock controller,
wherein each domain master is connected to a corresponding access network terminal with a respective bundle cable, and
wherein the clock controller is configured to:
operate the access multiplexer in a lock mode with a second access multiplexer by receiving a first synchronization signal from the second access multiplexer,
operate the access multiplexer in a hold over mode and transmit a second synchronization signal to a third access multiplexer, wherein the second synchronization signal is generated based on an internal clock of the access multiplexer in case that the first synchronization signal is not received from the second access multiplexer when the access multiplexer is operated in the lock mode, and
operate the access multiplexer in a free run mode and generate a third synchronization signal based on the internal clock of the access multiplexer when the first synchronization signal is not received from the sec- ond access multiplexer during initialization of the second access multiplexer, wherein the plurality of the domain masters are synchronized at a pre-determined frequency less than 10 kHz.

2. The access multiplexer of claim 1,
wherein each of the plurality of domain masters is configured to:
obtain a corresponding unique identifier, and
connect with the corresponding access network terminal using the obtained unique identifier.

3. The access multiplexer of claim 1, wherein the access multiplexer is configured to:
obtain a first identifier belonging to a first region in case of not receiving the first synchronization signal from the second access multiplexer and transmitting the second synchronization signal to the third access multiplexer,
obtain a second identifier belonging to a second region in case of receiving the first synchronization signal from the second access multiplexer and transmitting the received first synchronization signal to the third access multiplexer, and
obtain a third identifier belonging to a third region in case of receiving the first synchronization signal from the second access multiplexer and not transmitting the first synchronization signal to the third access multiplexer,
wherein the first, the second, and the third regions do not overlap.

4. An access network terminal configured to:
connect to a domain master in an access multiplexer via a bundle cable;
connect to the domain master with a common identifier; and
synchronize with the domain master without sending or receiving a clock signal, and
wherein the access multiplexer is configured to:
obtain, as the common identifier, a first identifier belonging to a first region in case of not receiving a first synchronization signal from a second access multiplexer and transmitting a second synchronization signal to a third access multiplexer;
obtain, as the common identifier, a second identifier belonging to a second region in case of receiving the first synchronization signal from the second access multiplexer and transmitting the received first synchronization signal to the third access multiplexer; and
obtain, as the common identifier, a third identifier belonging to a third region in case of receiving the first synchronization signal from the second access multiplexer and not transmitting the first synchronization signal to the third access multiplexer,
wherein the first, the second, and the third regions do not overlap, and
wherein the domain master is synchronized in the access multiplexer at a pre-determined frequency less than 10 kHz.

5. The access network terminal of claim 4, further configured to:
communicate with the domain master in at least one of a plurality of transmission opportunities, wherein each transmission opportunity corresponds to one period of multiple divisions of a frequency synchronized with the domain master.

6. An access network system configured to comprise:
a plurality of access multiplexers; and
a plurality of access network terminals,
wherein an access multiplexer in the plurality of access multiplexers is configured to comprise:
a plurality of domain masters,
a switch connected to each of the plurality of domain masters, and
a clock controller,
wherein each domain master is connected to a corresponding access network terminal in the plurality of access network terminals with a respective bundle cable, and
wherein the clock controller is configured to:
operate the access multiplexer in a lock mode with second access multiplexer in the plurality of access multiplexers by receiving a first synchronization signal from the second access multiplexer,
operate the access multiplexer in a hold over mode and transmit a second synchronization signal to a third access multiplexer in the plurality of access multiplexers, wherein the second synchronization signal is generated based on an internal clock of the access multiplexer in case that the first synchronization signal is not received from the second access multiplexer when the access multiplexer is operated in the lock mode, and
operate the access multiplexer in a free run mode and generate a third synchronization signal based on the internal clock of the access multiplexer when the first synchronization signal is not received from the second access multiplexer during initialization of the second access multiplexer,
wherein the plurality of the domain masters are synchronized at a pre-determined frequency less than 10 kHz.

7. The access network system of claim 6, wherein each of the plurality of domain masters is configured to:
obtain a corresponding unique identifier, and
connect with the corresponding access network terminal using the obtained unique identifier.

8. The access network system of claim 6,
wherein the access multiplexer is configured to:
obtain a first identifier belonging to a first region in case of not receiving the first synchronization signal from the second access multiplexer and transmitting the second synchronization signal to the third access multiplexer,
obtain a second identifier belonging to a second region in case of receiving the first synchronization signal from the second access multiplexer and transmitting the received first synchronization signal to the third access multiplexer, and
obtain a third identifier belonging to a third region in case of receiving the first synchronization signal from the second access multiplexer and not transmitting the first synchronization signal to the third access multiplexer,
wherein the first, the second, and the third regions do not overlap.

* * * * *